United States Patent
Maatta

(10) Patent No.: US 10,462,338 B2
(45) Date of Patent: Oct. 29, 2019

(54) FLOATING CAMERA MODULE

(71) Applicant: Microsoft Technology Licensing, LLC, Redmond, WA (US)

(72) Inventor: Esa Maatta, Espoo (FI)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 102 days.

(21) Appl. No.: 15/197,441

(22) Filed: Jun. 29, 2016

(65) Prior Publication Data

US 2018/0007243 A1    Jan. 4, 2018

(51) Int. Cl.
*H04N 5/225* (2006.01)

(52) U.S. Cl.
CPC ......... *H04N 5/2252* (2013.01); *H04N 5/2257* (2013.01)

(58) Field of Classification Search
CPC .. H04N 5/2252; H04N 5/2257; H04N 5/2254; G06F 3/0488; G06F 1/1616; G06K 9/00006
See application file for complete search history.

(56) References Cited

U.S. PATENT DOCUMENTS

| | | | |
|---|---|---|---|
| 6,785,935 B2 | 9/2004 | Ahn et al. | |
| 7,058,433 B2 | 6/2006 | Carpenter | |
| 7,139,473 B2 | 11/2006 | Shimano et al. | |
| 7,418,280 B2 | 8/2008 | Lee | |
| 7,477,315 B2 | 1/2009 | Shin | |
| 7,554,595 B2 | 6/2009 | Shin et al. | |
| 7,570,485 B2 * | 8/2009 | Krah | G06F 1/1616 345/157 |
| 8,098,319 B2 | 1/2012 | Demuynck | |
| 8,400,564 B2 | 3/2013 | Jacobs | |
| 10,084,948 B2 * | 9/2018 | Yu | H04N 5/2257 |
| 2003/0125079 A1 | 7/2003 | Park et al. | |
| 2006/0142053 A1 | 6/2006 | Garcia et al. | |
| 2006/0166712 A1 | 7/2006 | Wu | |

(Continued)

FOREIGN PATENT DOCUMENTS

| | | |
|---|---|---|
| CN | 202696688 U | 1/2013 |
| KR | 20040035251 A | 4/2004 |

(Continued)

OTHER PUBLICATIONS

Pierce, D., "Sony Tablet P review," The Verge Website, Available Online at http://www.theverge.com/2012/3/6/2847197/sony-tablet-p-review, Mar. 6, 2012, 8 pages.

(Continued)

*Primary Examiner* — Luong T Nguyen

(74) *Attorney, Agent, or Firm* — Alleman Hall Creasman & Tuttle LLP

(57) ABSTRACT

An electronic device includes a front side, a back side separated from the front side by a device thickness, and a camera having a lens side and a sensor side. The electronic device further includes a linkage floatably holding the camera relative to the front side and the back side, the linkage allowing the sensor side to extend from the front side responsive to force on the lens side of the camera, and the linkage allowing the lens side to extend from the back side responsive to force on the sensor side of the camera.

20 Claims, 7 Drawing Sheets

(56) References Cited

U.S. PATENT DOCUMENTS

| | | |
|---|---|---|
| 2009/0059043 A1 | 3/2009 | Demuynck |
| 2009/0233647 A1* | 9/2009 | Karlelid .............. H04M 1/0237 455/565 |
| 2011/0274422 A1 | 11/2011 | Lin |
| 2013/0076964 A1 | 3/2013 | Sirpal et al. |
| 2014/0106822 A1 | 4/2014 | Smith et al. |

FOREIGN PATENT DOCUMENTS

| | | |
|---|---|---|
| KR | 20050042515 A | 5/2005 |
| KR | 100569583 B1 | 4/2006 |
| KR | 20060086230 A | 7/2006 |

OTHER PUBLICATIONS

Demolder, Damien, "Google awarded patent for folding handheld camera design", Published on: Jan. 14, 2016 Available at: http://www.dpreview.com/news/8886350589/google-awarded-patent-for-folding-handheld-camera-design.

* cited by examiner

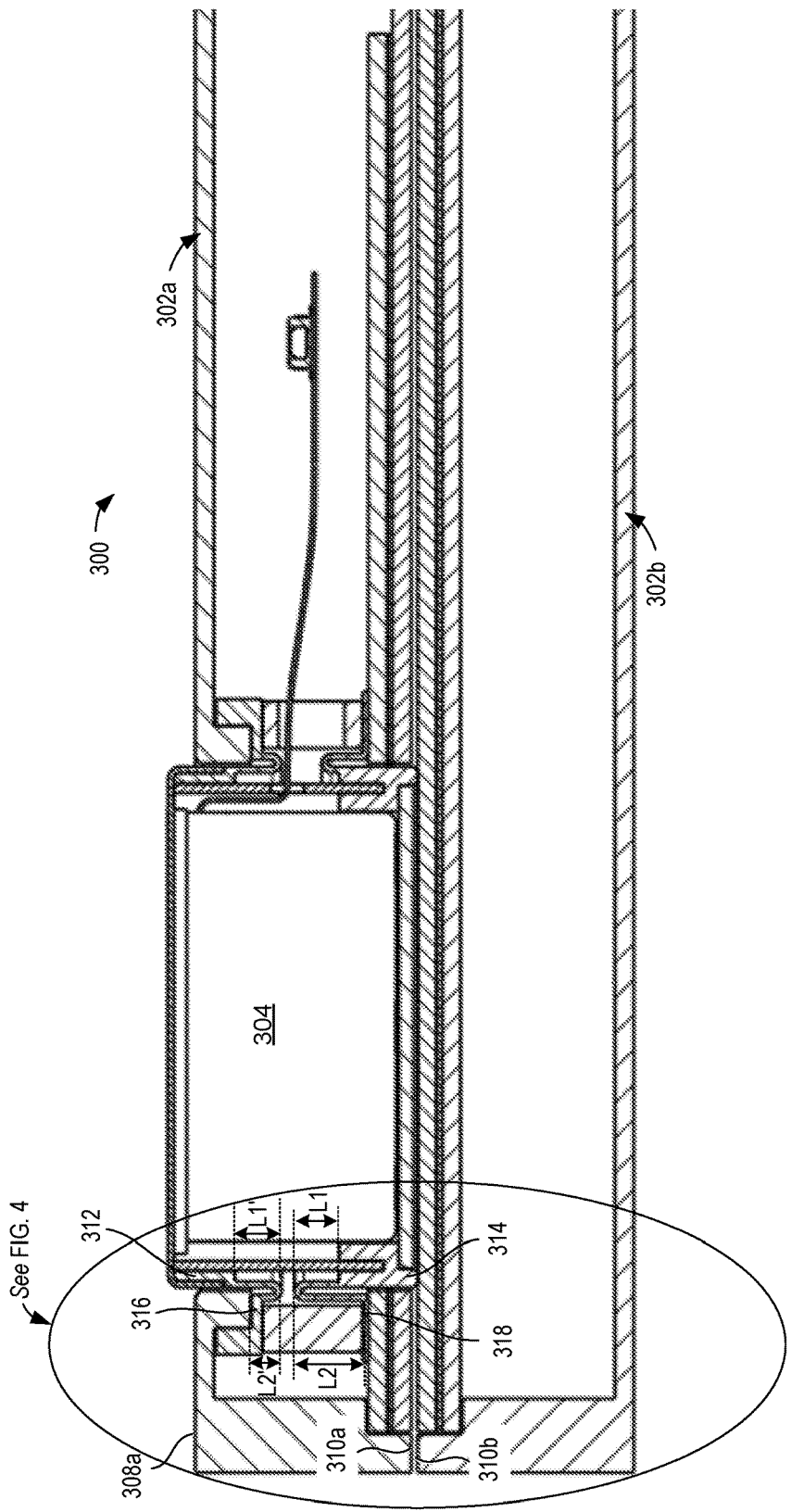

FLOATING CAMERA MODULE

BACKGROUND

Handheld electronic devices with integrated cameras are ubiquitous in the consumer market. Driven by user-comfort and aesthetic considerations, very thin handheld devices are increasingly desirable. Engineering extreme thinness in a camera may be challenging, however, as the focal length of the objective lens system of the camera imposes a lower limit on the thickness.

SUMMARY

As a result of decreasing thickness in handheld devices, an integrated camera may extend outside of the housing of the device. The present disclosure provides example electronic devices that accommodate camera protrusions by allowing camera modules to move to multiple positions within housings of the electronic devices responsive to force applied to the camera modules. An example electronic device includes a front side, a back side separated from the front side by a device thickness, and a camera having a lens side and a sensor side. The example electronic device further includes a linkage floatably holding the camera relative to the front side and the back side, the linkage allowing the sensor side to extend from the front side responsive to force on the lens side of the camera, and the linkage allowing the lens side to extend from the back side responsive to force on the sensor side of the camera.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B show a sectional view of an example electronic device including a floating camera module.

DETAILED DESCRIPTION

Figure 1A:
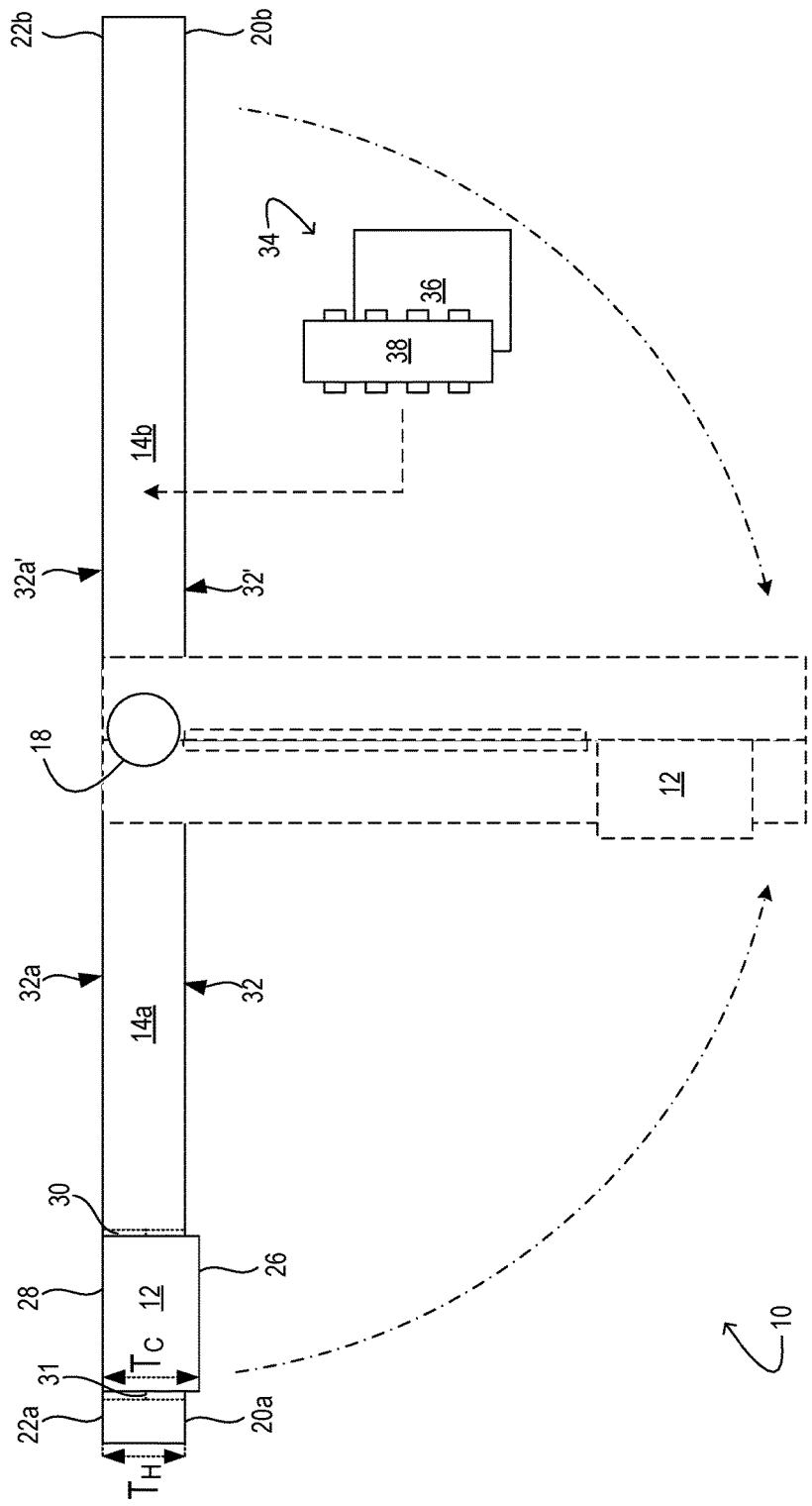
FIGS. 1A, 1B, 1C, and 1D show aspects of an example handheld electronic device.

Aspects of this disclosure will now be described by example and with reference to the drawing figures listed above. Components, process steps, and other elements that may be substantially the same in one or more embodiments are identified coordinately and described with minimal repetition. It will be noted, however, that elements identified coordinately may also differ to some degree. It will be further noted that the drawing figures are schematic and generally not drawn to scale. Unless otherwise noted, the various drawing scales, aspect ratios, and numbers of components shown in the figures may be purposely distorted to make certain features or relationships easier to see.

FIG. 1A shows aspects of an example handheld electronic device 10. The handheld device of FIG. 1 includes a camera 12 disposed in a first, camera-side housing 14a. A retaining member 18 connects the two housings. The handheld device may be embodied as a smartphone, tablet, or laptop computer system, for example. Handheld device 10 is configured to be transitionable, e.g., manually, between an unfolded or open state/configuration (drawn in solid lines) and a folded or closed state/configuration (drawn in broken lines). For example, the retaining member 18 may include a hinge or other mechanical structure enabling the two housings to be pivoted relative to one another between the open and folded states. The handheld device may be usable in both states, while some features of the device may be available only in one state or in the other.

Continuing in FIG. 1A, the camera 12 is coupled via the camera-side housing 14a to components on one side of retaining member 18. As illustrated, the camera 12 may have a depth or thickness TC that is thicker than the thickness TH of the camera-side housing 14a. For example, the camera 12 may be 6 to 10 millimeters in thickness, while the housing may be thinner (e.g., 1 to 5 millimeters in thickness). In other examples, the camera 12 may be otherwise positioned such that the camera protrudes from a surface of the housing.

Although illustrated as protruding or otherwise extending from inner face 20a in the open configuration, in other examples, the camera 12 may extend from outer face 22a. In such examples, the handheld device 10 may be configured to fold in an opposite direction via retaining member 18 relative to the illustrated folding operation. In still other examples, the handheld device 10 may be configured to pivot in both directions, such that the electronic device may be folded to the illustrated folded position (e.g., where the inner faces 20a and 20b are adjacent and/or come into contact with one another) and to an opposite folded position (e.g., where the outer faces 22a and 22b are adjacent and/or come into contact with one another). In some examples, two or more cameras may be included in the handheld device 10. Each camera may be positioned in either housing according to any of the examples provided herein.

Camera 12 of handheld device 10 is not particularly limited with respect to function; it may be a digital color camera, a night-vision camera, a video camera, a depth-imaging camera, etc. The camera may include an optical or lens side 26, which extends from the inner face 20a and includes optical components (e.g., one or more lenses, a protective window, and/or other optics) and a sensor side 28 which includes a sensor for detecting image light that passes through the optical components. The optical side is configured to collect light from a photographic subject. The sensor side is configured to capture an image of the subject using light collected by the objective portion. In the embodiment of FIG. 1A, handheld device 10 is primarily usable as a camera only while not in the folded state, as the optical side is covered by the inner face 20b in the folded state. However, other camera orientations and/or folding arrangements are within the scope of this disclosure.

The camera 12 is configured to be moveable within a recess 30 of first housing 14a via a linkage 31 floatably holding the camera relative to the housing. In the illustrated example, the camera 12 is flush with the outer face 22a and extending from the inner face 20a in the open configuration, and flush with the inner face 20a and extending from the outer face 22a in the closed configuration. The recess may accommodate different portions of the camera 12 based on a direction of force and/or a side of the camera to which force is applied. In this way, the two housings may lay flat against each other in the folded configuration (the camera moving to extend from the outer face 22a), decreasing the overall thickness of the handheld device 10.

The linkage 31 may include resilient materials and/or other structural features to bias the camera to one position in the absence of force and allow the camera to be moved to other positions responsive to the application of force to the camera. For example, the linkage 31 may include one or more gaskets with resilient features that allow the above-described movement of the camera while still floatably holding the camera to and/or within the housing. In other examples, the linkage 31 may include magnetic features (e.g., a magnetic material and/or a magnetically-attractable material), springs, and/or other linkages that allow the camera to move within the recess 30 as described herein. Examples of configurations of the linkage are described in more detail below with respect to FIGS. 2-5.

Although illustrated as including a first housing 14a and second housing 14b, in some examples, handheld device 10 may only include a single housing (e.g., housing 14a) with a front face (e.g., inner face 20a) and a back face (e.g., outer face 22a). In such examples, movement of the camera 12 may be controlled by forces other than a second housing coming into contact with the camera module. For example, the camera 12 may move responsive to a manual operation by a user (e.g., the user pressing the camera module), responsive to the electronic device being placed on or against a surface, and/or responsive to any other suitable force.

In the embodiment of FIG. 1A, at least one display panel (display panel 32, 32', for example) is coupled to each of first housing 14a and second housing 14b. Each display panel may be an organic light-emitting diode (OLED) or liquid-crystal display (LCD) panel, as non-limiting examples. In some examples, one or more of the display panels may support a resistive or capacitive touch screen. The display panel(s) may be continuous across both housings and/or may be separated by the retaining member 18 (e.g., creating at least one display on each housing). The position of the display panel 32, 32' (e.g., positioned at or on inner faces 20a and 20b) may correspond to examples where the camera 12 is a front-facing camera. The position of display panel 32a, 32a' (e.g., positioned at or on outer faces 22a and 22b) may correspond to examples where the camera 12 is a rear-facing camera.

Handheld device 10 may also include a flash and/or other hardware components not shown in FIG. 1A—cellular, WiFi, and Bluetooth radios, a global-positioning system (GPS) receiver, an inertial-measurement unit, for example. The various hardware components of the handheld device are operatively coupled to computer 34, which includes a logic machine 36 and an associated electronic memory machine 38. The electronic memory machine may hold instructions that cause the logic machine to execute the various computing actions and processes disclosed herein.

Figure 1B:
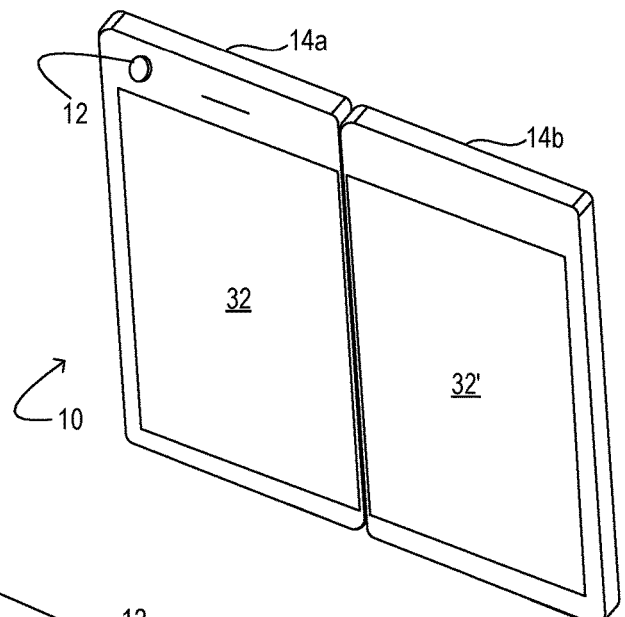
Figure 1C:
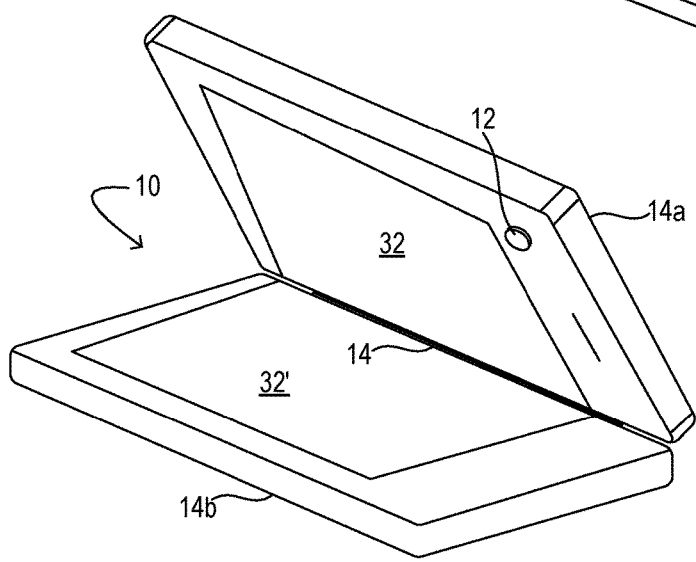
Figure 1D:
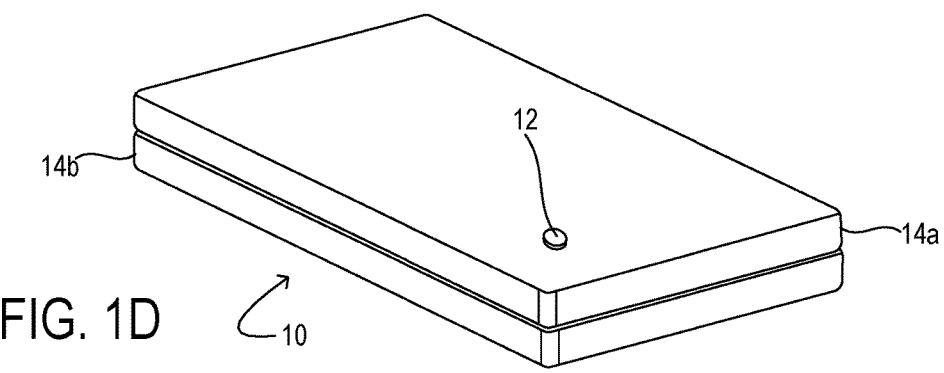

In the embodiment of FIG. 1A, the retaining member 18 includes a hinge. Hinged transitioning between folded and unfolded states of the handheld device is further illustrated in the perspective drawings of FIGS. 1B, 1C, and 1D. FIG. 1B shows the handheld device in the unfolded state. FIG. 1D shows the handheld device in the folded state, where the housings 14a and 14b lay flat against one another. FIG. 1C shows the handheld device in a partially folded state.

The placement of the camera 12 relative to the rest of handheld device 10 illustrated in FIGS. 1A-1D is exemplary in nature. The camera may be positioned in any suitable location relative to the handheld device. For example, the camera may be positioned closer to the hinged area between the two housings and/or may be positioned on an opposite housing relative to the illustrated example (e.g., the camera 12 may be positioned in housing 14b). Despite the benefits that a folding handheld device offers, other configurations are also envisaged. For example, although open configurations have been described herein in context of a foldable device, the handheld device 10 may be a non-folding device, and another structure such as a table, wall, hand, or other object may provide the force to move the camera 12. Furthermore, any references to a front or back side in this disclosure do not limit the functionality of either side. The terms front and back are not intended to identify the functionality of any particular side of a device. Rather, the two terms are used together in order to distinguish between two different sides—either term, front or back, can be used to describe any side of a device as long as the other term is used to describe the opposite side. One or both sides of a housing that includes the camera module may include or omit one or more displays, input devices, and/or other features. In some examples, one or both sides of the housing that includes the camera module may include no other features besides the camera module when the camera module protrudes through that side(s).

Figure 2:
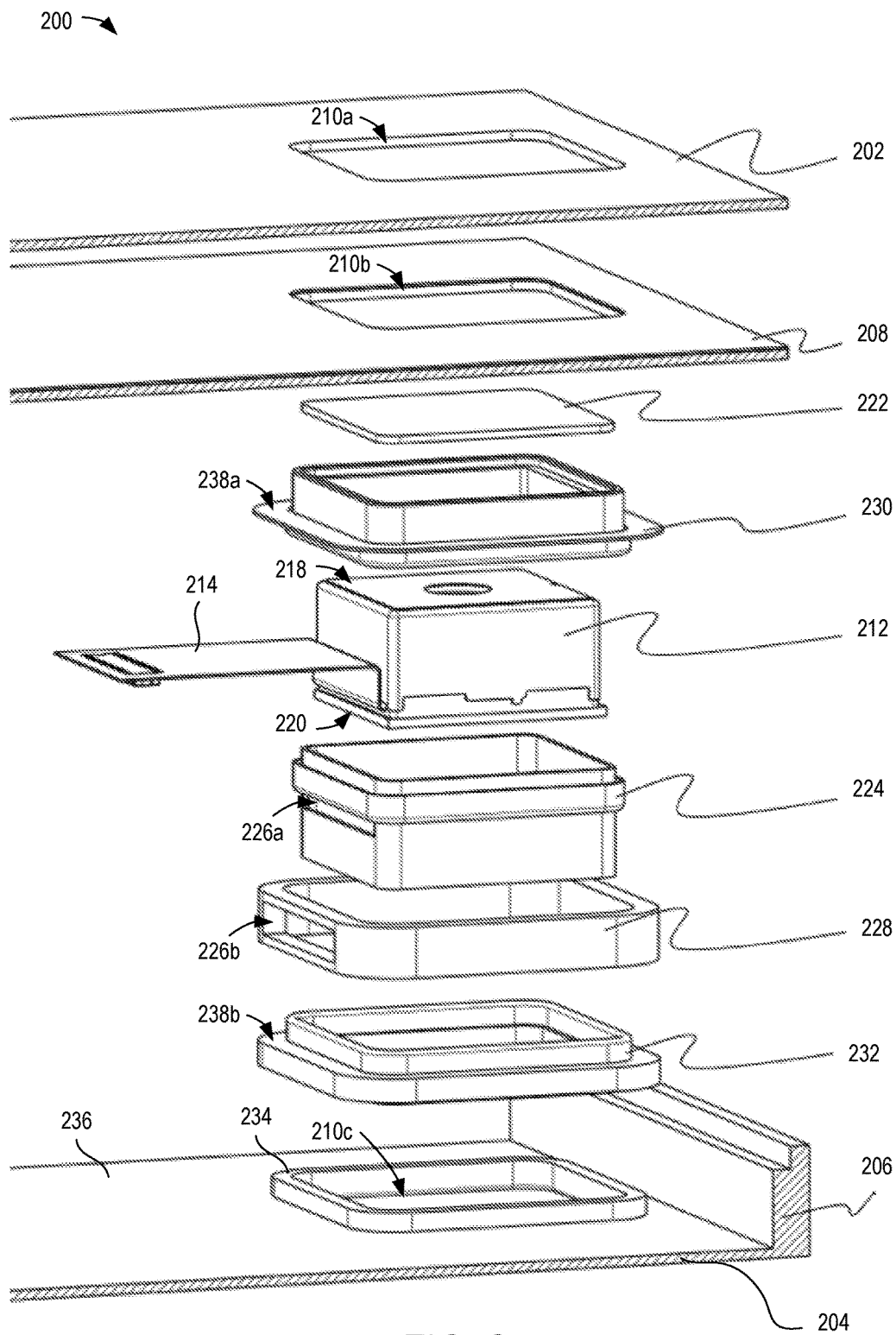
FIG. 2 schematically shows an exploded view of an example housing of an electronic device including a floating camera module.

FIG. 2 shows an example exploded view of a housing 200 of an electronic device. The housing 200 may be an example of housing 14a of electronic device 10 of FIGS. 1A-1D, for example. The housing 200 may include a lens-side housing wall 202 and a sensor-side housing wall 204. The remaining components of FIG. 2 may be at least partially housed within walls 202 and 204. For example, sensor-side housing wall 204 may include and/or be coupled to a side wall 206. Lens-side housing wall 202 may be configured to be secured to the side wall 206, where the height of the side wall 206 may correspond to a thickness of housing 200. An additional support structure 208 may be coupled to the lens-side housing wall 202. Each of the lens-side housing wall 202, the additional support structure 208, and the sensor-side housing wall 204 may include a respective opening 210a/210b/210c through which a camera module 212 may pass.

The camera module 212 may be an example of camera 12 of FIGS. 1A-1D, for example. As illustrated, the camera module 212 may include a communication link 214 (e.g., a printed circuit board with electrical traces disposed thereon, a ribbon connector, and/or another suitable communication pathway) coupling the camera module to a computing device, e.g., computer 34 of FIG. 1A. Image data and/or other information from the camera module may be transmitted to the computing device 216 via the communication link 214. Additionally or alternatively, control instructions (e.g., focus, zoom, shutter, and/or other suitable control instructions) from the computing device 216 may be transmitted to the camera module 212 via the communication link 214.

The camera module 212 may include a lens side 218 and a sensor side 220. An at least partially transparent window 222 may be positioned between the lens side 218 and the openings 210a/210b in order to protect the optical components of the camera module. In some examples, the window 222 may include a filter. In other examples, the window 222 may include diffraction gratings and/or other elements to alter an optical path of light entering the camera module 212. In still other examples, the window 222 may be substantially clear (e.g., with a refractive index that is close to the refractive index of air).

The camera module 212 may be housed by a camera housing 224, which may include a link opening 226a to allow communication link 214 to pass through (e.g., from the camera module 212 to outside of the camera housing 224). The camera housing 224 may be coupleable with a gasket housing 228, which may provide structural features to couple to a lens-side gasket 230 and a sensor-side gasket 232. In this way, the gaskets 230 and 232 may be coupled to the camera module 212 via gasket housing 228 and camera housing 224. The gasket housing 228 may include a link opening 226b, which may be aligned with link opening 226 in an assembled state in order to allow the communication link 214 to pass through from the camera module 212 to outside of the gasket housing 228.

Sensor-side gasket 232 may be coupled to the housing 200 (e.g., the sensor-side housing wall 204) via a gasket support 234. Although not illustrated in the view shown in FIG. 2, a similar gasket support may be similarly arranged relative to lens-side housing wall 202 to couple the lens-side gasket 230 to the housing 200. The gasket support 234 may extend around a periphery of opening 210c in housing wall 204 and above an interior surface 236 of housing wall 204 into the housing 200. Accordingly, the sensor-side gasket 232 may be coupled between the gasket support 234 and the gasket housing 228.

Each of the gaskets 230 and 232 may substantially surround a periphery of the camera module 212 (e.g., forming a collar around the camera module) in order to hold the camera module within the housing 200 and guide movement of the camera module between different positions (e.g., extending outside of the housing wall 202, extending outside of the housing wall 204, and/or other positions in between). In order to facilitate such support and guidance, the gaskets may include respective resilient flanges 238a and 238b. The flanges may be deformed based on the direction of movement of the camera, an example of which is shown in FIGS. 3A and 3B.

Figure 3A:
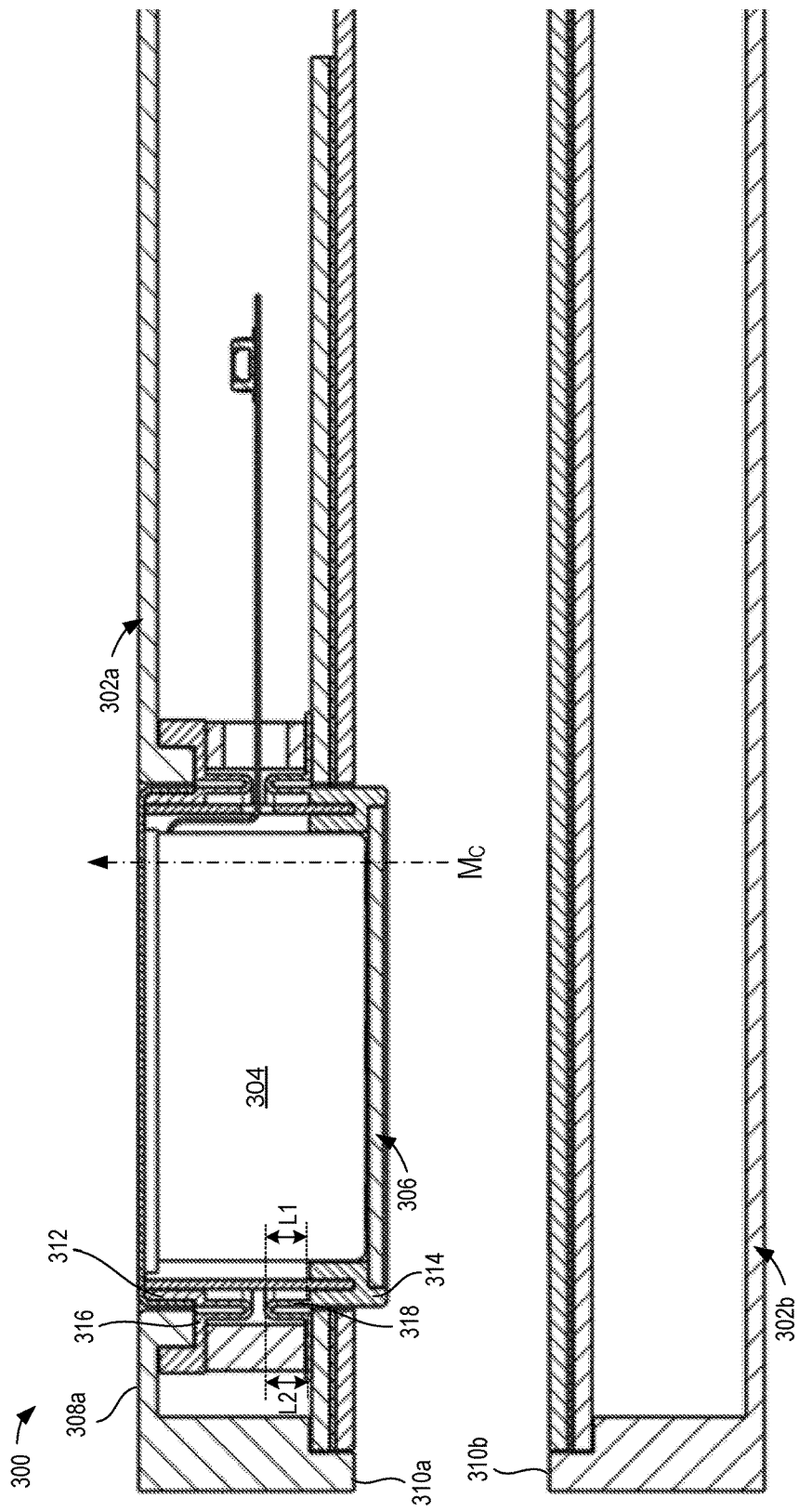

FIGS. 3A and 3B show a section view of a portion of an electronic device 300 including a first housing 302a and a second housing 302b. For example, electronic device 300 may be an example of handheld device 10 of FIGS. 1A-1D and housing 302a may be an example of housing 14a of FIGS. 1A-1D and/or housing 200 of FIG. 2. Electronic device 300 may include some or all of the components described above with respect to FIG. 2. For example, housing 302a may include a camera module 304. A window 306 may be coupled to a lens side of the camera module and may protect optical components of the camera module 304.

FIG. 3A shows the electronic device 300 in an at least partially open configuration, where no force is applied to the camera and/or where only gravitational force is applied to a sensor side of the camera. Accordingly, in the view of FIG. 3A, the sensor side of the camera is shown as being flush with an outer face 308a of the housing 302a, while the lens side of the camera is shown as protruding outside of inner face 310a (opposite the outer face) of the housing 302a. Although open configurations have been described herein in context of a foldable device, the electronic device 300 may be a non-folding device, and another structure such as a table, wall, hand, or other object may provide the force to move the camera. In such examples, housing 302b may correspond to the object providing the force, rather than a second housing of a foldable device.

The camera module is coupled to the housing 302a via a sensor-side gasket 312 and a lens-side gasket 314, which may correspond to the components of the same name in FIG. 2. As illustrated, the sensor-side gasket 312 is coupled to the outer face 308a of the housing 302a via resilient flange 316. The lens-side gasket 314 is coupled to the inner face 310a of the housing 302a via resilient flange 318. Each of the flanges may include at least one fold, which may be rolled to allow the camera to move within the housing 302a. For example, flange 318 may include a first length L1 and a second length L2 each extending in a direction of movement of the camera $M_C$ (e.g., extending substantially parallel to the direction of movement $M_C$). The lengths L1 and L2 may be coupled to one another via a bend, and positioned between the camera module 304 and a third length that extends in a direction that is perpendicular to L1, L2, and $M_C$. The third length may be coupled to the inner face 310a of the housing 302a.

While the camera module 304 is in the position illustrated in FIG. 3A, the lengths of L1 and L2 may be substantially equal, or the length L1 may be longer than L2. However, as the camera moves in the direction $M_C$, the lengths of L2 and L2 may change. FIG. 3B shows the electronic device 300 in a substantially closed configuration, where the inner face 310a of the housing 302a comes into contact with an inner face 310b of the housing 302b. Accordingly, the inner face 310b of housing 302b exerts a force on camera module 304 to move the camera module within the housing 302a to extend from the outer face 308a of the housing 302a. The resilient flange 318 of the lens-side gasket 314 accommodates and guides such movement by shortening the length of L1 and lengthening the length of L2 as the camera module moves in the direction $M_C$ shown in FIG. 3A. Accordingly, two lengths of a given flange are changed inversely from one another (e.g., one is lengthened while the other is shortened). Although the lengths L1 and L2 are described above with respect to lens-side gasket 314 and associated resilient flange 318, the sensor-side gasket 312 and associated resilient flange 316 is structured similarly.

Figure 4:
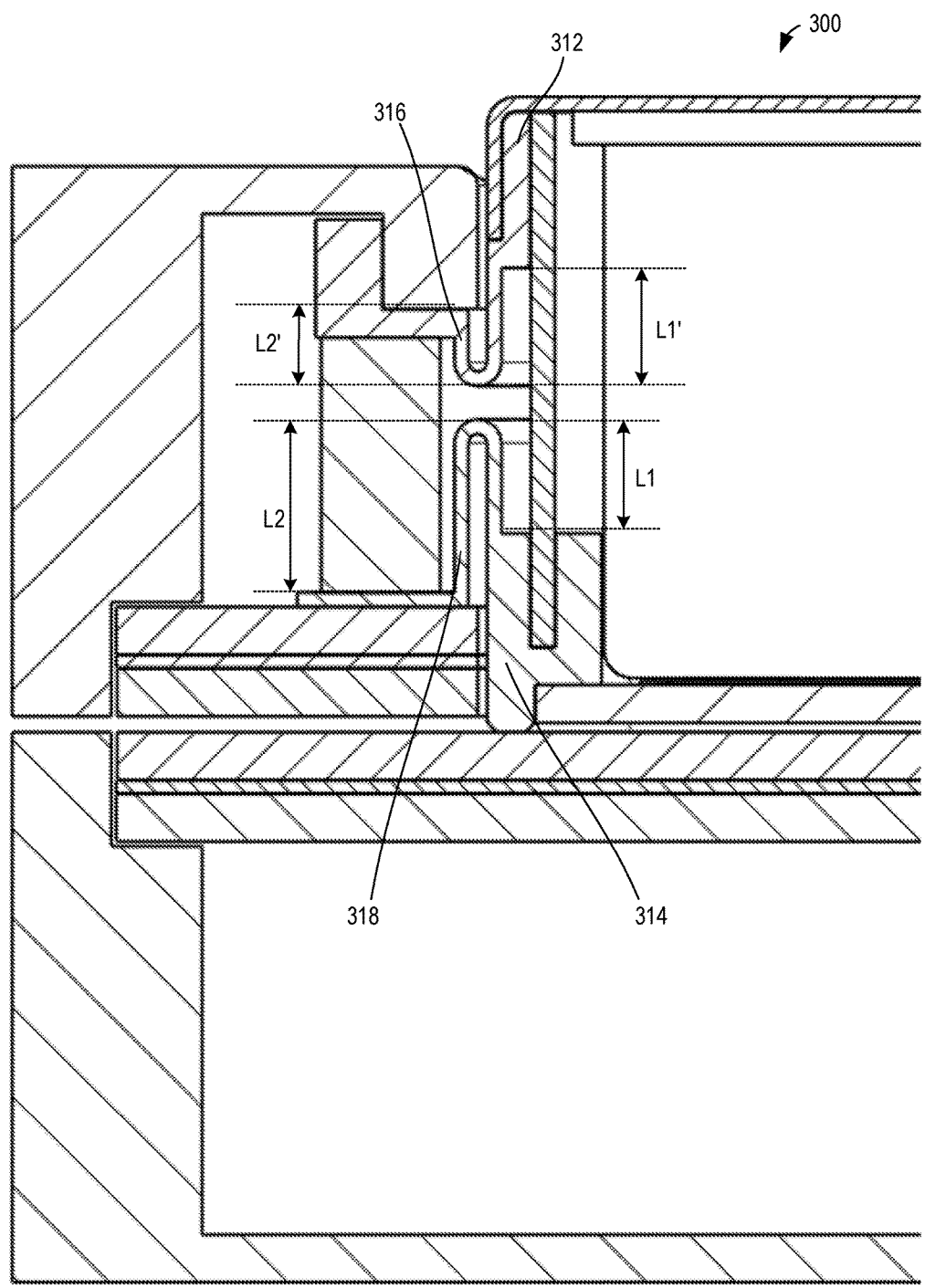
FIG. 4 shows a detailed view of a portion of the electronic device illustrated in FIG. 3B.

FIG. 4 shows a close-up view of resilient flanges 316 and 318 and associated lengths L1, L1', L2, and L2' in the state illustrated in FIG. 3B. As shown in FIG. 4, length L1 is shorter than length L2, and length L1' is longer than length L2'.

Figure 5:
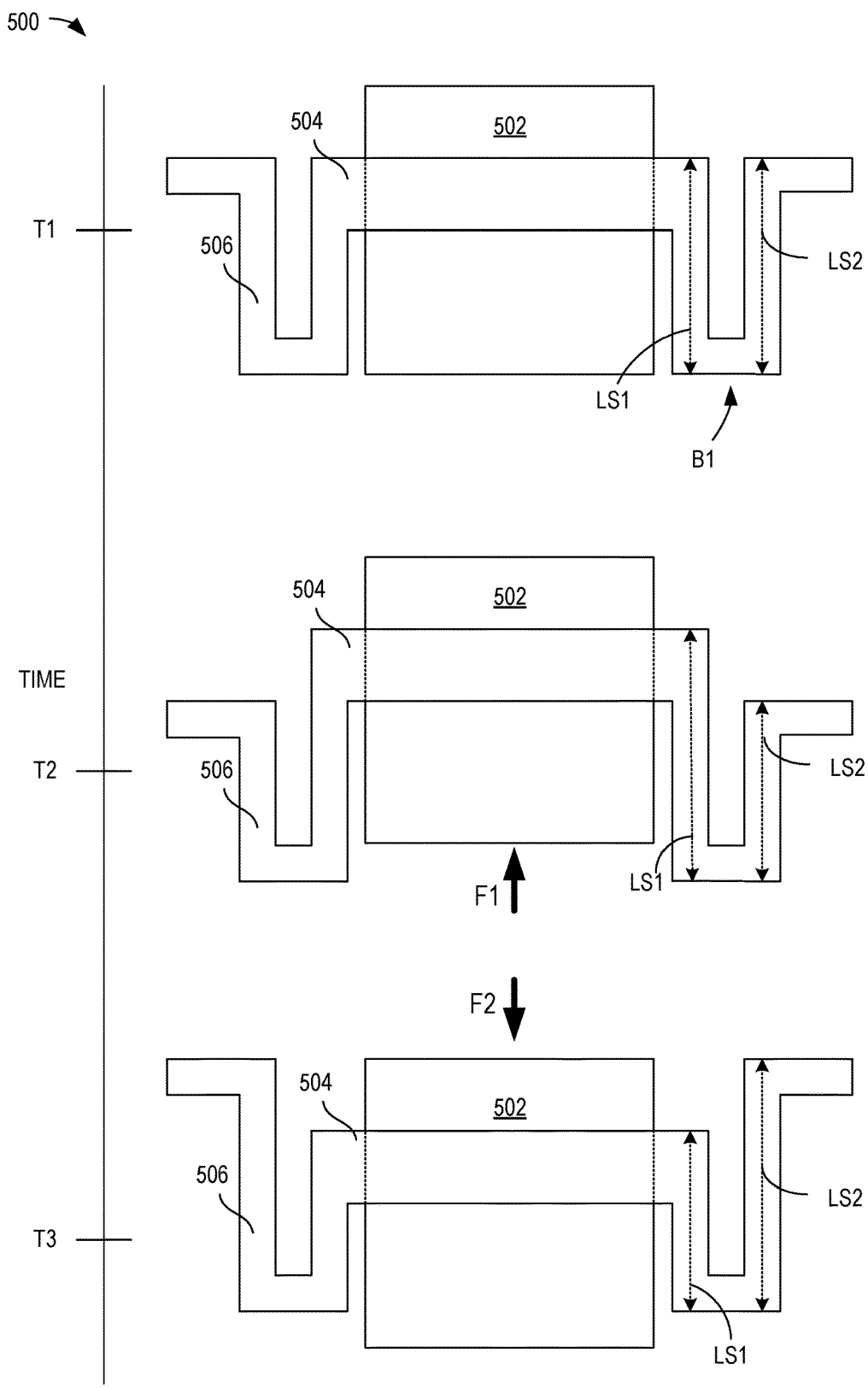
FIG. 5 schematically shows a timeline of movement of a camera module in an example gasket.

A similar change in lengths of a flange of a gasket may be exhibited in example devices that include only a single gasket, rather than the two illustrated in FIGS. 2, 3A, and 3B. FIG. 5 schematically shows an example timeline 500 showing a single-gasket arrangement at different times during movement of a camera module 502. Camera module 502 may be an example of camera module 304 of FIG. 3, 212 of FIG. 2, and/or 12 of FIGS. 1A-1D.

The camera module 502 may be coupled to a gasket 504 including a resilient flange 506. The resilient flange 506 may extend from a peripheral region of the camera and include a first length LS1, and a second length LS2. The first length and the second length may be coupled to one another via a bend B1. Time T1 may correspond to a neutral state of the camera module 502 (e.g., when no force is applied and/or when only gravitational force or a force below a threshold amount is applied). Length LS1 is substantially equal to length LS2 at time T1 in the illustrated example. In other embodiments, LS1 and LS2 may have different lengths in the neutral state.

In response to a first force applied in a direction F1 (e.g., to a bottom of the camera module 502), the gasket 504 may guide the camera module upward by lengthening first length LS1 and shortening second length LS2 such that the first length LS1 is longer than the second length LS2 at time T2.

In response to a second force applied in a direction F2 (e.g., opposite to direction F1—to a top of the camera module 502), the gasket 504 may guide the camera module downward by shortening first length LS1 and lengthening second length LS2 such that the first length LS1 is less than the second length LS2 at time T3. During each of the above-described movements, a third length L3 that extends perpendicularly to lengths LS1 and LS2 and the direction of movement of the camera module, may remain stationary (e.g., coupled to an associated housing).

The above-described gasket configurations are exemplary in nature, and other configurations that enable the movement of a camera within a housing as described above may be used. In some embodiments, a camera may be resiliently biased to extend from one face of a camera by magnetism, but a floating coupling may allow the camera to move against the biasing responsive to external forces. In some embodiments, resilient gaskets of an accordion design may be used. Regardless of the particular coupling structure, by allowing the camera to move within the housing, cameras that extend from a first surface of a device may be shifted to extend from an opposing surface responsive to force applied to the first surface. In this way, either surface of the device may be flush with any other surface, even when a camera is larger than the width of a housing of the device. Such accommodation of large camera sizes enables a device to be configured without sacrificing camera quality for overall device thinness.

Another example provides for an electronic device including a front side, a back side separated from the front side by a device thickness, a camera having a lens side and a sensor side, and a linkage floatably holding the camera relative to the front side and the back side, the linkage allowing the sensor side to extend from the front side responsive to force on the lens side of the camera, and the linkage allowing the lens side to extend from the back side responsive to force on the sensor side of the camera. Such an example may additionally or alternatively include the electronic device, wherein the lens side and the sensor side are separated from one another by a camera depth that is greater than the device thickness. Such an example may additionally or alternatively include the electronic device, wherein the front side and the back side are opposing sides of a first housing, the electronic device further comprising a second housing and a hinge pivotably connecting the first housing to the second housing for rotation between at least a folded configuration and an open configuration, wherein the front side is adjacent to an inner side of the second housing in the folded configuration. Such an example may additionally or alternatively include the electronic device, wherein the linkage includes a gasket. Such an example may additionally or alternatively include the electronic device, wherein the gasket is coupled to the camera and includes a resilient flange coupled to the first housing. Such an example may additionally or alternatively include the electronic device, wherein the gasket forms a collar around a periphery of the camera. Such an example may additionally or alternatively include the electronic device, wherein the resilient flange includes a first length extending in a direction of movement of the camera, a second length extending in the direction, and a bend between the first length and the second length. Such an example may additionally or alternatively include the electronic device, wherein the resilient flange is configured to roll such that the first length is lengthened while the second length is shortened during movement of the camera in a first direction. Such an example may additionally or alternatively include the electronic device, wherein the resilient flange is configured to roll such that the first length is shortened while the second length is lengthened during movement of the camera in a second direction, the second direction being opposite of the first direction. Such an example may additionally or alternatively include the electronic device, wherein the gasket includes a first gasket and the resilient flange includes a first resilient flange, the electronic device further comprising a second gasket coupled to the camera, the second gasket including a second resilient flange, the first resilient flange being coupled to the front side, and the second resilient flange being coupled to the back side. Any or all of the above-described examples may be combined in any suitable manner in various implementations.

Another example provides for an electronic device including a first housing including a first inner face and a first outer face, a second housing including a second inner face and a second outer face, a hinge pivotably connecting the first housing to the second housing for rotation between at least a folded configuration and an open configuration, wherein the first inner face is adjacent the second inner face in the folded configuration, a camera having a lens side and a sensor side, and a linkage floatably holding the camera relative to first housing, the linkage allowing the sensor side to extend from the first inner face in the open configuration, and the linkage allowing the lens side to extend from the first outer face in the folded configuration. Such an example may additionally or alternatively include the electronic device, wherein a camera depth extending from the lens side to the sensor side of the camera is greater than a first housing thickness extending from the first inner face to the first outer face. Such an example may additionally or alternatively include the electronic device, wherein the linkage includes a gasket positioned within the housing. Such an example may additionally or alternatively include the electronic device, wherein the gasket forms a collar around a periphery of the camera. Such an example may additionally or alternatively include the electronic device, wherein the gasket is coupled to the camera and includes a resilient flange coupled to the first housing. Such an example may additionally or alternatively include the electronic device, wherein the resilient flange includes a first length extending in a direction of movement of the camera, a second length extending the direction of movement of the camera, and a bend between the first length and the second length. Such an example may additionally or alternatively include the electronic device, wherein the resilient flange is configured to roll such that the first length is lengthened while the second length is shortened during movement of the camera in a first direction. Such an example may additionally or alternatively include the electronic device, wherein the flange is configured to roll such that the first length is shortened while the second length is lengthened during movement of the camera in a second direction, the second direction being opposite of the first direction. Such an example may additionally or alternatively include the electronic device, wherein the resilient flange includes an accordion-shaped member configured to expand or retract during movement of the camera relative to the first housing. Any or all of the above-described examples may be combined in any suitable manner in various implementations.

Another example provides for an electronic device including a front side, a back side separated from the front side by a device thickness, a camera having a lens side and a sensor side, and a linkage floatably holding the camera relative to the front side and the back side, the linkage including a gasket with a resilient flange that allows the sensor side to move to extend from the front side responsive to force on the lens side of the camera and the lens side to move to extend from the back side responsive to force on the sensor side of the camera, the resilient flange including a first length extending substantially parallel to a direction of movement of the camera, a second length extending substantially parallel to the first length, and a bend between the first length and the second length, the resilient flange configured to roll such that the first length is lengthened while the second length is shortened during movement of the camera in a first direction, and the resilient flange configured to roll such that the first length is shortened while the second length is lengthened during movement of the camera in a second, opposite direction. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic device, comprising:
   a front side;
   a back side separated from the front side by a device thickness;
   a camera having a lens side and a sensor side, wherein the lens side and the sensor side are separated from one another by a camera depth that is greater than the device thickness; and
   a linkage floatably holding the camera, the linkage configured to move the camera within a recess between the front side and the back side such that the sensor side extends through and past the front side responsive to force on the lens side of the camera, and the lens side extends through and past the back side responsive to force on the sensor side of the camera.

2. The electronic device of claim 1, wherein the front side and the back side are opposing sides of a first housing, the electronic device further comprising a second housing and a hinge pivotably connecting the first housing to the second housing for rotation between at least a folded configuration and an open configuration, wherein the front side is adjacent to an inner side of the second housing in the folded configuration.

3. The electronic device of claim 1, wherein the linkage includes a gasket.

4. The electronic device of claim 3, wherein the gasket is coupled to the camera and includes a resilient flange coupled to the first housing.

5. The electronic device of claim 4, wherein the gasket forms a collar around a periphery of the camera.

6. The electronic device of claim 4, wherein the resilient flange includes a first length extending in a direction of movement of the camera, a second length extending in the direction, and a bend between the first length and the second length.

7. The electronic device of claim 6, wherein the resilient flange is made of a flexible material, configured to flexibly roll such that the first length is lengthened while the second length is shortened during movement of the camera in a first direction.

8. The electronic device of claim 7, wherein the resilient flange is configured to roll such that the first length is shortened while the second length is lengthened during movement of the camera in a second direction, the second direction being opposite of the first direction.

9. The electronic device of claim 4, wherein the gasket includes a first gasket and the resilient flange includes a first resilient flange, the electronic device further comprising a second gasket coupled to the camera, the second gasket including a second resilient flange, the first resilient flange being coupled to the front side, and the second resilient flange being coupled to the back side.

10. An electronic device, comprising:
    a first housing including a first inner face and a first outer face;
    a second housing including a second inner face and a second outer face;
    a hinge pivotably connecting the first housing to the second housing for rotation between at least a folded configuration and an open configuration, wherein the first inner face is adjacent the second inner face in the folded configuration;
    a camera having a lens side and a sensor side, wherein a camera depth extending from the lens side to the sensor side of the camera is greater than a first housing thickness extending from the first inner face to the first outer face; and
    a linkage floatably holding the camera, the linkage configured to move the camera within a recess between the first inner face and first outer face of the first housing, such that the sensor side extends through and past the first inner face in the open configuration, and the lens side extends through and past the first outer face in the folded configuration.

11. The electronic device of claim 10, wherein the linkage includes a gasket positioned within the housing.

12. The electronic device of claim 11, wherein the gasket forms a collar around a periphery of the camera.

13. The electronic device of claim 11, wherein the gasket is coupled to the camera and includes a resilient flange coupled to the first housing.

14. The electronic device of claim 13, wherein the resilient flange includes a first length extending in a direction of movement of the camera, a second length extending the direction of movement of the camera, and a bend between the first length and the second length.

15. The electronic device of claim 14, wherein the resilient flange is configured to roll such that the first length is lengthened while the second length is shortened during movement of the camera in a first direction.

16. The electronic device of claim 15, wherein the flange is configured to roll such that the first length is shortened while the second length is lengthened during movement of the camera in a second direction, the second direction being opposite of the first direction.

17. The electronic device of claim 13, wherein the resilient flange includes an accordion-shaped member configured to expand or retract during movement of the camera relative to the first housing.

18. An electronic device, comprising:
    a front side;

a back side separated from the front side by a device thickness;

a camera having a lens side and a sensor side; and a linkage floatably holding the camera between the front side and the back side, the linkage including a gasket with a resilient flange that allows the sensor side to move to extend through and past the front side responsive to force on the lens side of the camera and the lens side to move to extend through and past the back side responsive to force on the sensor side of the camera, the resilient flange including a first length extending substantially parallel to a direction of movement of the camera, a second length extending substantially parallel to the first length, and a bend between the first length and the second length, the resilient flange configured to roll such that the first length is lengthened while the second length is shortened during movement of the camera in a first direction, and the resilient flange configured to roll such that the first length is shortened while the second length is lengthened during movement of the camera in a second, opposite direction.

19. The electronic device of claim 1, wherein the recess extends between a hole in the front side and a hole in the back side, so that the front side surrounds the camera and the back side surrounds the camera.

20. The electronic device of claim 10, wherein the recess extends between a hole in the first inner face and a hole in the first outer face, so that the first inner face of the first housing surrounds the camera, and the first outer face of the first housing surrounds the camera.

* * * * *